M. O. SNEDIKER.
WATER MOTOR.
APPLICATION FILED JULY 27, 1914.

1,152,566.

Patented Sept. 7, 1915.

Witnesses:

Inventor
Morton O. Snediker

UNITED STATES PATENT OFFICE.

MORTON O. SNEDIKER, OF CHICAGO, ILLINOIS, ASSIGNOR TO THE POWERS REGULATOR COMPANY, OF CHICAGO, ILLINOIS, A CORPORATION OF ILLINOIS.

WATER-MOTOR.

1,152,566.

Specification of Letters Patent.

Patented Sept. 7, 1915.

Application filed July 27, 1914. Serial No. 853,280.

*To all whom it may concern:*

Be it known that I, MORTON O. SNEDIKER, a citizen of the United States, and resident of Chicago, in the county of Cook and State of Illinois, have invented certain new and useful Improvements in Water-Motors, of which the following is a specification.

My invention relates to water motors and has particular reference to a novel valve operating device for use in connection therewith.

An object in the construction and operation of water motors is to provide means for simply and efficiently reversing the valves. This should be accomplished by positive means but preferably by means which are not positively or rigidly connected to the moving parts. In my device the reversal of the valve is effected by the pressure of the fluid itself, the pressure controlling valve for the main piston being disconnected from any moving part of the pump. By this arrangement I am enabled to avoid the possibility of the motor stopping on center. Furthermore the operating mechanism is almost entirely noiseless, is not subject to excessive wear and is generally satisfactory.

Figure 1:
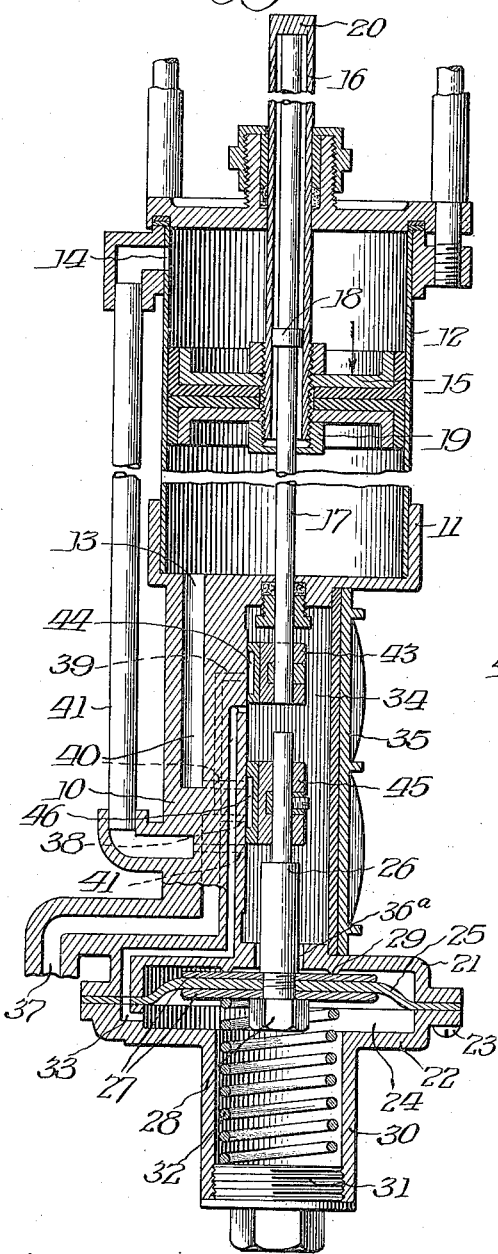
Figure 2:
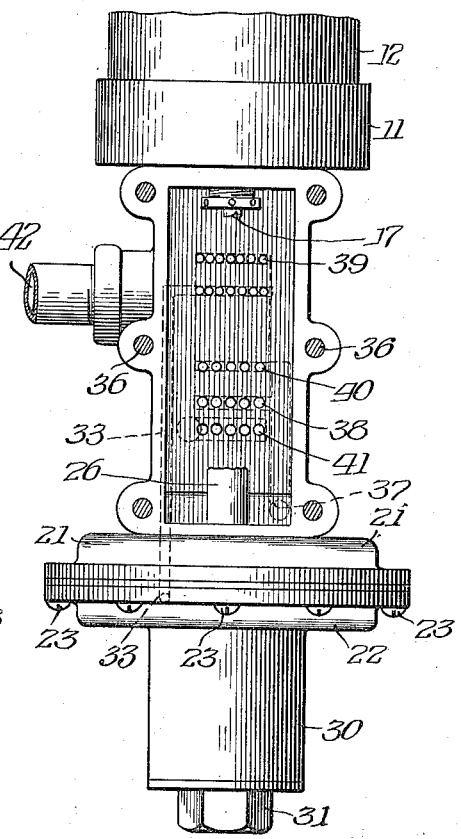

The invention will be more readily understood by reference to the accompanying drawings wherein, Figure 1 is a longitudinal section through a water motor constructed in accordance with my invention; and Fig. 2 is a fragmentary plan view of the valve casing with the valves removed.

Referring more particularly to the drawings it will be seen that I provide a valve casing 10, to which is connected by suitable flanges 11, a cylinder 12, having ports 13, 14, therein, for the admission and exit of the actuating fluid. A piston 15, is mounted in the cylinder, the piston being provided with a hollow stem 16, within which a valve operating rod 17, is mounted. This rod is provided with a collar 18, as shown a nut 19, passing over the end of the hollow stem, the nut being provided with an opening fitting the rod 17. The hollow portion of the stem 16, terminates at 20, and provides an abutment for the end of the rod 17. The nut 19 is arranged to contact the collar 18 on the rod. Just prior to the extremity of movement of the piston the rod will be moved by the contact of its end with the stop 20, or by contact of the collar 18, with the nut 19. Thus the rod is moved a short distance at the completion of each stroke of the piston the movements of the rod being in opposite directions. The end of the valve casing 10, is provided with annular flanges 21, to which a cap 22, is secured by means of the screws 23, thereby forming a recess 24. Within this recess is mounted a diaphragm 25, the periphery of which is held between the uniting flanges of the parts 21, 22. A stem 26 extends through an opening in the end of the valve casing and its reduced end portion is secured to the diaphragm by means of plates 27, and a nut 28. Stops 29, prevent the seating of the plate flatly against the face of the flanges 21. The cover plate 22 is provided with an integral hollow boss 30, closed by a plug 31, within which a coiled spring 32, is seated, this spring bearing against the diaphragm and tending to advance the stem 26. A passage 33 provides for communication between the space 24 and the valve chamber 34, formed in the valve casing 10. This chamber is adapted to be closed by means of a cover plate 35, held in place by suitable screws 36. As will be seen, the passage 33, communicates with the space on one side of the diaphragm 25, the other side of the diaphragm being in constant communication with the valve chamber because of the open space 36ª, surrounding the stem 26. Thus with the parts in the position shown in Fig. 1, the fluid pressure on each side of the diaphragm will be equal and the spring will hold the balance of power. A passage 37, communicates with a waste outlet, this passage having branch inlet passages 38, 39, communicating with the valve chamber. The ports 13, 14, in the cylinder communicate with the valve chamber by means of passages or pipes 40, 41 respectively. Fluid is admitted to the valve chamber through the opening 42, the supply of which is controlled by a suitable valve, not shown. Connected to the stem 17 is a valve 43, having a recess 44, in its face and secured to the stem 26 is a similar valve member 45, having a recess 46, in its face.

With the parts in the position of Fig. 1, and with pressure in the valve chamber 34, the piston will be moving in the direction indicated by the arrow. In such position of the parts fluid will pass through the passage-way 41, and port 14, to the top of the piston as viewed in Fig. 1. The fluid at the bottom of the piston will escape through the passage 40, passage 38 and waste outlet 37.

Pressure from the valve chamber passes through the conduit or passage 33, to the lower portion of the diaphragm 25 and the pressure being equalized on both sides of the diaphragm, the spring holds the stem 26 and valve 45 in the position shown. When the piston nears its lower limit of travel the end of the rod 17 will be contacted by the abutment 20, and force the valve 43 downward, cutting off communication between the valve chamber and the passage 33 and placing said passage 33 in communication with the passage 39, through the recess 44, in the face of the valve. This permits the fluid below the diaphragm to exhaust and the continued pressure in the valve chamber exerted on the top of the diaphragm will overcome the force of the spring 32, and move the valve 45 downward, thereby placing passages 41 and 38 in communication and opening passage 40, to the valve chamber. In such position the fluid in the valve chamber will pass through the passage 40 and be exerted against the piston to force the same upward, the fluid on the top of the piston exhausting through the passages 41, 38, to the waste outlet 37.

It will be seen that the valve member which controls the entrance of fluid to the cylinder is controlled solely by pressure on the fluid itself; that it is impossible for the motor to stop on center and that the parts are all readily accessible for repairs or inspection. The device is exceedingly simple and as stated, practically noiseless in operation.

I claim:

1. In a fluid motor, the combination of a cylinder and a piston, a valve casing provided with ports leading to said cylinder on both sides of said piston, a valve for controlling said ports, means for moving said valve, means for admitting fluid under service pressure to both sides of said valve actuating means and a spring also acting upon said valve actuating means and exerting the balance of power to move said valve in one direction, substantially as described.

2. In a fluid motor, the combination of a cylinder and a piston, a valve casing, a valve controlling ports which admit fluid to and exhaust the same from said cylinder, a diaphragm associated with said valve, means for exerting fluid pressure against said diaphragm to move said valve in one direction, and combined fluid pressure and spring means for moving said diaphragm and valve in the opposite direction, substantially as described.

3. In a fluid motor, the combination of a cylinder and a piston, a valve casing, a valve controlling ports which admit fluid to and exhaust the same from said cylinder, a diaphragm associated with said valve, means for exerting a constant fluid pressure against one side of said diaphragm, a spring exerting a constant pressure against the other side of said diaphragm, and means for admitting fluid to and exhausting the same from the spring side of said diaphragm to cause the movement of said valve, substantially as described.

4. In a fluid motor, the combination of a cylinder and a piston, a valve casing, a valve controlling ports which admit fluid to and exhaust the same from said cylinder, a diaphragm and a spring moving said valve, means for exerting equal fluid pressure on both sides of said diaphragm, the pressure on one side plus the force of the spring causing movement of the valve in one direction, the exhausting of pressure on that side of the diaphragm causing movement in the opposite direction due to overcoming the spring force by pressure, substantially as described.

5. In a fluid motor, the combination of a cylinder and a piston, a valve casing, a valve controlling ports which admit fluid to and exhaust the same from said cylinder, a diaphragm, a spring, means for exerting combined spring and fluid pressure on one side of said diaphragm, a constant pressure being exerted on the opposite side of the diaphragm, and a valve for controlling ports for the admission of fluid to and exhausting the same from the spring side of the diaphragm, substantially as described.

6. In a fluid motor, the combination of a cylinder and a piston, a valve casing, a valve controlling ports which admit fluid to and exhaust the same from said cylinder, a diaphragm, a spring, means for exerting combined spring and fluid pressure on one side of said diaphragm, a constant pressure being exerted on the opposite side of the diaphragm, and a positively moved valve for controlling ports for the admission of fluid to and exhausting the same from the spring side of the diaphragm, substantially as described.

7. In a fluid motor, the combination of a cylinder and a piston, a valve casing provided with ports and passages communicating with said cylinder, a slide valve controlling said ports, actuating means for said valve, means for maintaining constant service pressure on one side of said valve actuating means, a spring on the other side of said valve actuating means, and means for intermittently admitting service pressure to the spring side of said valve actuating means, substantially as described.

8. In a water motor, the combination of a cylinder and a piston, a valve casing and a diaphragm casing, a diaphragm in said casing, said parts being provided with passages connecting the valve chamber with one side of said diaphragm and other passages connecting the valve chamber with the cylinder, a valve connected to said diaphragm and controlling the passage to said cylinder, and a second valve, operatively associated with the piston and controlling the passages communicating with the diaphragm casing, substantially as described.

9. In a water motor, the combination of a cylinder and a piston having a hollow stem, a valve casing containing a chamber, a diaphragm casing containing a chamber, passages connecting said valve chamber to said cylinder and said diaphragm casing, a valve mounted in said valve casing, said valve controlling the passages connecting with said diaphragm casing and having a stem entering said hollow piston, a second valve controlling the passages connecting with said cylinder and a diaphragm for operating said last named valve, substantially as described.

10. In a water motor, the combination of a cylinder and a piston, valves controlling the entrance of fluid to said cylinder, a diaphragm for operating said valve, means for admitting fluid pressure to both sides of said diaphragm, the pressure on one side of said diaphragm being constant, a spring on the opposite side of said diaphragm, and a valve controlling the admission to and exhaust of fluid to the spring side of said diaphragm, substantially as described.

Signed at Chicago, Illinois, this 24th day of July, 1914.

MORTON O. SNEDIKER.

Witnesses:
 CHAS. T. MURRAY,
 T. D. BUTLER.

Copies of this patent may be obtained for five cents each, by addressing the "Commissioner of Patents, Washington, D. C."